US012511643B2

(12) United States Patent
Tham et al.

(10) Patent No.: US 12,511,643 B2
(45) Date of Patent: Dec. 30, 2025

(54) USER ASSUMPTION OF IDENTITY OF NFT IN CRYPTO WALLET

(71) Applicants: Yu Jiang Tham, Seattle, WA (US); Andrés Monroy-Hernández, Seattle, WA (US); Ana Maria Cardenas Gasca, Pasadena, CA (US)

(72) Inventors: Yu Jiang Tham, Seattle, WA (US); Andrés Monroy-Hernández, Seattle, WA (US); Ana Maria Cardenas Gasca, Pasadena, CA (US)

(73) Assignee: Snap Inc., Santa Monica, CA (US)

( * ) Notice: Subject to any disclaimer, the term of this patent is extended or adjusted under 35 U.S.C. 154(b) by 405 days.

(21) Appl. No.: 17/566,934

(22) Filed: Dec. 31, 2021

(65) Prior Publication Data

US 2023/0214819 A1 Jul. 6, 2023

(51) Int. Cl.
*G06Q 20/36* (2012.01)
*G06Q 20/38* (2012.01)
*G06Q 20/40* (2012.01)
*G06Q 50/00* (2012.01)

(52) U.S. Cl.
CPC ....... *G06Q 20/363* (2013.01); *G06Q 20/3674* (2013.01); *G06Q 20/3827* (2013.01); *G06Q 20/40145* (2013.01); *G06Q 50/01* (2013.01)

(58) Field of Classification Search
CPC ............ G06Q 20/363; G06Q 20/3674; G06Q 20/3827; G06Q 20/40145; G06Q 50/01
See application file for complete search history.

(56) References Cited

U.S. PATENT DOCUMENTS 11,182,467 B1 * 11/2021 Medina ................. G06F 3/147
11,532,002 B1 * 12/2022 Atreya ............... G06Q 30/0613
(Continued)

FOREIGN PATENT DOCUMENTS

| CN | 113537907 A | 10/2021 | |
|---|---|---|---|
| WO | WO-2022238854 A1 * | 11/2022 | |
| WO | WO-2022269998 A1 * | 12/2022 | ............. G06Q 50/01 |

OTHER PUBLICATIONS

International Search Report and Written Opinion received in Patent Cooperation Treaty Application No. PCT/US2022/050206, dated Apr. 5, 2023, 10 pages.

*Primary Examiner* — Neha Patel
*Assistant Examiner* — Jahed Ali
(74) *Attorney, Agent, or Firm* — CM Law; Stephen J. Weed

(57) ABSTRACT

A system and associated methods display on a user device a non-fungible token (NFT) in an application that displays video data. The methods include storing the NFT of a user in a database accessible to the application, associating an ID of the user for the application to the NFT, and receiving a selection of the NFT during use of the application. Upon selection, the selected NFT is provided to the user device for superimposing the selected NFT over the user's face, providing the selected NFT as a background image for the video data on the user device, or both. The user device includes a web application that connects the database to a crypto wallet containing the NFT. The NFT may be processed to crop out the eyes and mouth of the NFT for registration with the user's eyes and mouth when the NFT is superimposed over the user's face.

19 Claims, 7 Drawing Sheets

(56) References Cited

U.S. PATENT DOCUMENTS

| | | | |
|---|---|---|---|
| 2013/0278706 A1* | 10/2013 | Connelly | H04N 21/4316 |
| | | | 348/584 |
| 2014/0139609 A1* | 5/2014 | Lu | G06T 11/60 |
| | | | 348/14.03 |
| 2015/0310503 A1* | 10/2015 | Murphy | G06Q 30/0275 |
| | | | 705/14.71 |
| 2016/0019538 A1* | 1/2016 | Arif | G06T 7/90 |
| | | | 705/44 |
| 2016/0350953 A1* | 12/2016 | Mittelstaedt | H04L 51/043 |
| 2017/0140236 A1* | 5/2017 | Price | G06N 3/045 |
| 2017/0278286 A1* | 9/2017 | An | G06T 11/60 |
| 2018/0077347 A1* | 3/2018 | Tanaka | G06V 40/162 |
| 2019/0108682 A1* | 4/2019 | Spivack | G06Q 30/0277 |
| 2020/0242105 A1* | 7/2020 | Rich | H04L 67/1097 |
| 2021/0279695 A1* | 9/2021 | Rice | G06Q 20/12 |
| 2021/0304506 A1* | 9/2021 | Mourkogiannis | G06T 17/20 |
| 2022/0207115 A1* | 6/2022 | van Manen | H04N 21/47205 |
| 2022/0236846 A1* | 7/2022 | Leung | G06F 3/0488 |
| 2022/0383295 A1* | 12/2022 | Cox | G06Q 20/3278 |
| 2023/0042269 A1* | 2/2023 | Benedetto | A63F 13/80 |
| 2023/0057073 A1* | 2/2023 | Walker | G06T 7/70 |
| 2023/0073859 A1* | 3/2023 | Matthews | G06Q 30/0641 |
| 2023/0079127 A1* | 3/2023 | Benedetto | A63F 13/69 |
| 2023/0098615 A1* | 3/2023 | Advani | H04L 63/00 |
| | | | 713/193 |
| 2023/0102606 A1* | 3/2023 | Advani | H04L 9/50 |
| | | | 726/4 |
| 2023/0108983 A1* | 4/2023 | Vosseller | G06Q 20/38215 |
| | | | 705/76 |
| 2023/0114235 A1* | 4/2023 | Eivy | G06T 19/006 |
| | | | 705/66 |
| 2023/0138023 A1* | 5/2023 | Yang | A63F 13/792 |
| | | | 463/42 |
| 2023/0177490 A1* | 6/2023 | Moore | G06Q 20/3827 |
| | | | 705/66 |
| 2023/0376922 A1* | 11/2023 | Gristina | G06F 21/1015 |
| 2024/0139634 A1* | 5/2024 | Meyers | G06Q 20/36 |
| 2024/0273515 A1* | 8/2024 | Wiklof | G06Q 20/3672 |

* cited by examiner

USER ASSUMPTION OF IDENTITY OF NFT IN CRYPTO WALLET

TECHNICAL FIELD

The present subject matter relates to a system and methods for allowing a user to assume the identity of a Non-Fungible Token (NFT) in their crypto wallet, and, more particularly, to systems and methods for setting the NFT image that the user selects as an overlay on the user's face or as background during online video interactions.

BACKGROUND

Technologies such as non-fungible tokens (NFT) allow individuals to own virtual digital objects. NFTs are cryptographic assets on a blockchain with unique identification codes and metadata that distinguish them from each other. Digital artists may generate art in a digital media and tie the art to digital tokens that can be bought, sold, and traded to enable the artist to profit from her artwork. The NFTs are, in essence, computer files that are combined with proof of ownership and authenticity for the digital artwork generated by the digital artist. Artists who wish to sell their work as NFTs sign up with an NFT marketplace such as Nifty Gateway, OpenSea or SuperRare, then mint digital tokens by uploading and validating their information on a blockchain such as the Ethereum blockchain. The NFTs may then be listed for auction on the NFT marketplace for purchase.

BRIEF DESCRIPTION OF THE DRAWINGS

Features of the various implementations disclosed will be readily understood from the following detailed description, in which reference is made to the appending drawing figures. A reference numeral is used with each element in the description and throughout the several views of the drawing. When a plurality of similar elements is present, a single reference numeral may be assigned to like elements, with an added lower-case letter referring to a specific element.

The various elements shown in the figures are not drawn to scale unless otherwise indicated. The dimensions of the various elements may be enlarged or reduced in the interest of clarity. The several figures depict one or more implementations and are presented by way of example only and should not be construed as limiting. Included in the drawing are the following figures.

DETAILED DESCRIPTION

Figure 1:
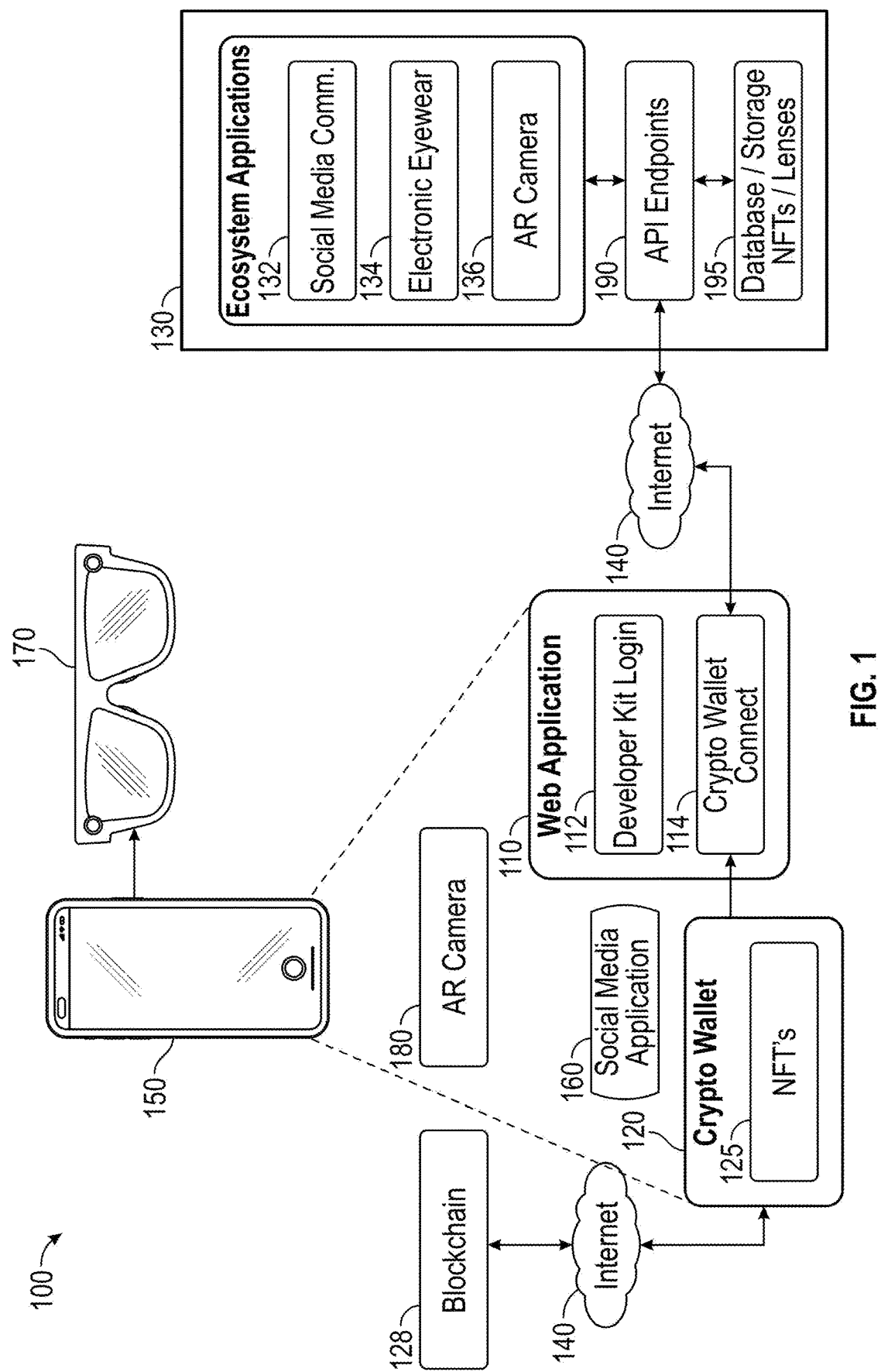
FIG. 1 illustrates a system for enabling a user to connect the user's crypto wallet to a backend service that associates the user's social media ID with NFTs in the user's crypto wallet in a sample configuration.

The system and method described herein allows users to connect, using a social media developer's kit, the user's crypto wallet to a backend service that then associates the user's social media ID with Non-Fungible Tokens (NFTs) in the user's crypto wallet. The user can then assume the identity of one or more of their NFTs by displaying a selected NFT over the user's face during a video call or when taking a selfie. The NFT may also be used as background during a video call. In a sample configuration, the images of the user's NFTs may be stored with Snapchat Lenses of a Snap Camera available from Snap, Inc. of Santa Monica, California.

The system and methods are implemented using a web application that allows users to log in via the social media developer's kit and connect to the user's crypto wallet. The web application then sends the NFT image data from the user's crypto wallet to database/storage application programming interface (API) endpoints for storage in a database. The API endpoints receive the NFT image data from the web application and resize and change the file type of the NFT image data (if necessary) to make the NFT image data more easily accessible for the social media and augmented reality applications and save the processed NFT image data to storage instances of an Augmented Reality (AR) Lens. The Lens system accesses the user's NFT image data from the API endpoints and lets the user access the user's NFT image data from the Lens system in the same way that the user accesses other Lenses. The user's smartphone or other computing device may then set the selected NFT image as an overlay for the user's face, as a background, or both.

The system and method described herein display on a user device a non-fungible token (NFT) in an application (e.g., a social media application) that displays video data. The methods include storing the NFT of a user in a database accessible to the application, associating an ID of the user for the application to the NFT, and receiving a selection of the NFT during use of the application. Upon selection, the selected NFT is provided to the user device for superimposing the selected NFT over the user's face, providing the selected NFT as a background image for the video data on the user device, or both. The user device includes a web application that connects the database to a crypto wallet containing the NFT. The NFT may be processed to crop out the eyes and mouth of the NFT for registration with the user's eyes and mouth when the NFT is superimposed over the user's face.

The following detailed description includes systems, methods, techniques, instruction sequences, and computer program products illustrative of examples set forth in the disclosure. Numerous details and examples are included for the purpose of providing a thorough understanding of the disclosed subject matter and its relevant teachings. Those skilled in the relevant art, however, may understand how to apply the relevant teachings without such details. Aspects of the disclosed subject matter are not limited to the specific devices, systems, and methods described because the relevant teachings can be applied or practiced in a variety of ways. The terminology and nomenclature used herein is for the purpose of describing particular aspects only and is not intended to be limiting. In general, well-known instruction instances, protocols, structures, and techniques are not necessarily shown in detail.

The term "connect," "connected," "couple," and "coupled" as used herein refers to any logical, optical, physical, or electrical connection, including a link or the like by which the electrical or magnetic signals produced or supplied by one system element are imparted to another coupled or connected system element. Unless described otherwise, coupled, or connected elements or devices are not necessarily directly connected to one another and may be separated by intermediate components, elements, or communication media, one or more of which may modify, manipulate, or carry the electrical signals. The term "on" means directly supported by an element or indirectly supported by the element through another element integrated into or supported by the element.

Additional objects, advantages and novel features of the examples will be set forth in part in the following description, and in part will become apparent to those skilled in the art upon examination of the following and the accompanying drawings or may be learned by production or operation of the examples. The objects and advantages of the present subject matter may be realized and attained by means of the methodologies, instrumentalities and combinations particularly pointed out in the appended claims.

Reference now is made in detail to the examples illustrated in the accompanying drawings and discussed below with respect to FIGS. 1-5.

FIG. 1 illustrates a system 100 including a web application 110 for enabling a user to connect the user's crypto wallet 120 to a backend server 130 adapted to associate the user's social media ID with NFTs 125 in the user's crypto wallet 120 in a sample configuration. It will be appreciated by those skilled in the art that the NFTs may be encrypted and stored on blockchain 128 and accessed via the internet 140 or via a local network (not shown). The user's crypto wallet 120 may include, in addition to NFTs 125, at least one of cryptocurrency or a crypto checking account. Commonly used Ethereum wallets include MetaMask, Ledger Nano X, and Coinbase Wallet. The user may load the digital wallet by converting real-world cash into cryptocurrency (such as Ether).

In the system 100 shown in FIG. 1, individuals may access the internet 140 using their client devices 150, which may be a smart phone, a laptop, a desktop, or any other computing device that enables communications via the internet 140. The client devices 150 enable users to access the backend server 130 that includes backend services available to the client devices 150. For example, the backend services may include applications such as social media communications application 132 that supports exchanging messages amongst users of a social media network having social media application 160 loaded onto their client devices 150, electronic eyewear services 134 for supporting electronic eyewear devices such as electronic eyewear device 170 (e.g., SPECTACLES® available from Snap, Inc. of Santa Monica, California), and AR camera services 136 that support the provision of augmented reality images (e.g., Lenses available from Snap, Inc. of Santa Monica, California) to AR camera 180 of the client devices 150.

In sample configurations, the web application 110 includes a developer kit 112 (e.g., SnapKit available from Snap, Inc. of Santa Monica, California) and crypto wallet connection software 114. The developer kit 112 allows users to log in and connect to the user's crypto wallet 120 using the crypto wallet connection software 114. The crypto wallet connection software 114 sends the NFT image data representing the NFTs 125 from the user's crypto wallet 120 to database/storage application programming interface (API) endpoints 190 for storage in a database 195. As illustrated in FIG. 1, the NFTs 125 may be stored with AR lenses for use by applications 132, 134, and 136 during provision of the respective services to the users. The API endpoints 190 receive the NFT image data representing the NFTs 125 from the crypto wallet connection software 114 and resize and change the file type of the NFT image data (if necessary) to make the NFT image data more easily accessible by the applications 132, 134, and 136. For example, the processed NFT image data representing the NFTs 125 may be saved to storage instances of AR Lenses. During use, the Lens system may access the user's NFT image data from the API endpoints 190 so that the user may access the user's NFT image data from the Lens system in the same way that the user may access other Lenses. The user's client device 150 may then set the selected NFT 125 as an overlay for the user's face, as a background, or both in the same way that the user would for an AR Lens.

In sample configurations, the NFTs 125 may be virtual digital objects or augmented reality objects of any kind. Typically, the NFTs 125 have real-world monetary value that is represented in cryptocurrency stored on the blockchain 128. As explained below with respect to FIG. 3, users may browse through the NFTs 125 that they own and also may use social media platforms to browse through lists of NFTs 125 owned by their friends that their friends have made available for their use (assuming proper permissions). Users may show the NFTs 125 the user owns or has borrowed from another user through an AR camera (e.g., Snapchat or Snap Camera) during video calls or as they capture live pictures or videos with an AR camera when they are authenticated as owners of a cryptocurrency wallet where the NFTs 125 are stored or are verified as a user authorized to borrow an NFT 125 from another user. Some NFTs 125 also may be configured to appear in the AR camera 180 of the user's client device 150 only under specific constraints. For example, the display of a particular NFT 125 may be permitted only on a particular pre-registered face or location, as specified in the metadata of the NFT 125. In sample configurations, an application program running on the user's client device 150 may include a verified AR renderer component that may be used by AR camera 180 (e.g., Snapchat camera) to convert the NFT image data into visual/audio/etc. representations that appear on the feed of the AR camera 180.

It will be appreciated by those skilled in the art that the user's client device 150, electronic eyewear 170, server computer 130, and blockchain 128 need not be owned or operated by the same entity. For example, the server computer 130 and the social media application 160 running on the user's client device 150 or electronic eyewear 170 may be owned and operated by one entity, while the blockchain 128 may be a public blockchain or a private blockchain operated by an authentication entity, which may be the same or different from the entities providing the social media service.

The NFT image data from the database 195 may be accessed by the social media application 160, electronic eyewear device 170, and AR camera 180 of the user or corresponding applications of another user for display with the user's image as taken by AR camera 180 or may be accessed by a graph API of the user's social media application 160 or the other user's social media application to return a listing of NFTs 125 owned by that user and stored in the user's crypto wallet 120. Social media applications such as those available from Snap, Inc. or Instagram may be adapted for such applications.

As noted above, the NFT 125 may be accessed by the social media application 160 of the user or the corresponding social media application 160 of another user for display with the user's image as taken by the user's AR camera 180 or may be accessed by a graph API of the user's social media application 160 or the other user's social media application 160 to return a listing of the NFTs owned by that user and stored in the user's crypto wallet 120. In sample configurations, the social media applications 160 are implemented on user client devices 150. A sample configuration of a user client device 150 in the form of a smartphone will be described below with respect to FIG. 4.

Figure 2A:
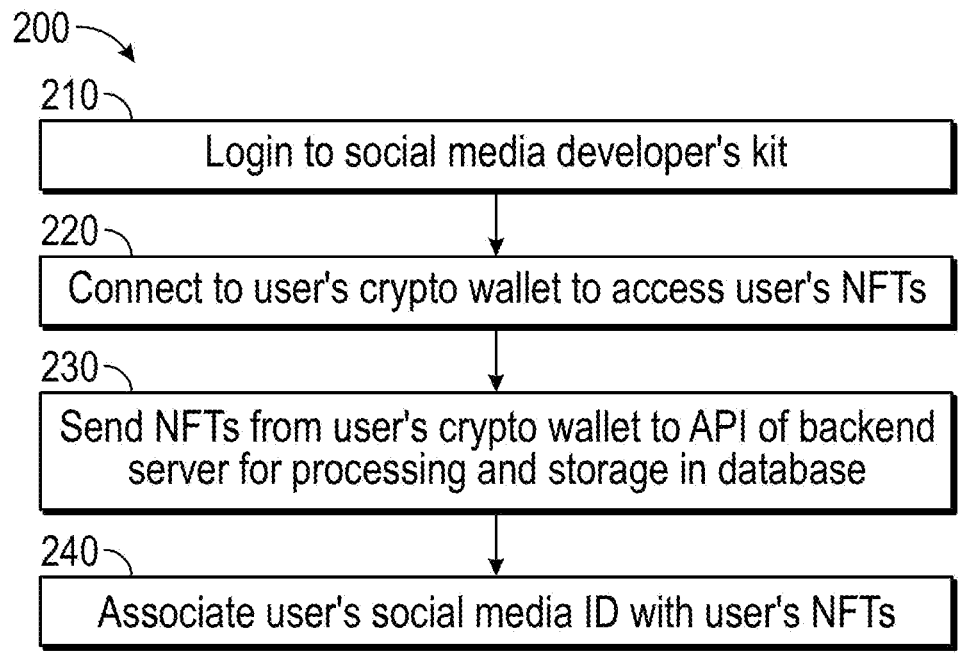
FIG. 2A illustrates a flow chart of the web application that connects the user's crypto wallet to the backend service in a sample configuration.

FIG. 2A illustrates a flow chart 200 illustrating the operation of the web application 110 that connects the user's crypto wallet 120 to backend server 130 via API endpoints 190 in a sample configuration. As illustrated, the web application enables the user at 210 to log in to the social media developer's kit 112 (e.g., SnapKit available from Snap, Inc. of Santa Monica, California) to access the crypto wallet connection software 114. At 220, the crypto wallet connection software 114 opens an API of the crypto wallet 120 to connect the user to the user's crypto wallet 120 to access the user's NFTs 125. At 230, the crypto wallet connection software 114 then sends the NFT image data representing the NFTs 125 from the user's crypto wallet 120 to the database/storage application programming interface (API) endpoints 190 for storage in a database 195. Before being stored, the backend server 130 may process the NFT image data to crop, limit file size, etc. as needed for compatibility with the applications that may access the NFT image data. For example, the NFT data may be processed to crop out eyes and the mouth of the NFT images so that the user's eyes and mouth may be viewed through the cropped portion when the NFT image is superimposed over the user's face. The NFTs 125 may be stored within one Lens or may be stored as separate Lenses. The user's social media ID is then associated with the user's NFTs at 240. The user's NFTs 125 are now available for access by the applications 132, 134, and 136 of the backend server 130 using the user's social media ID.

Figure 2B:
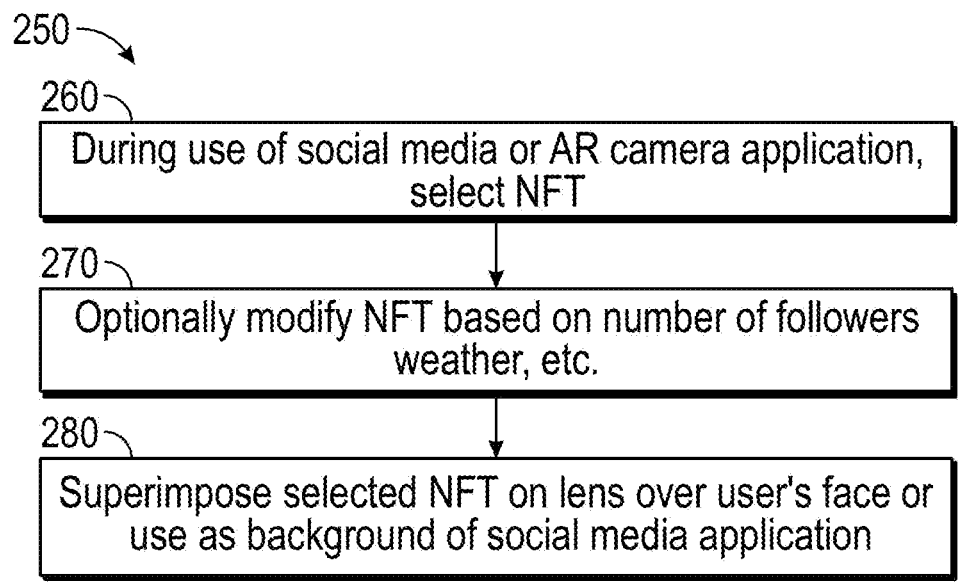
FIG. 2B illustrates a flow chart for use of the stored NFTs in a sample configuration.

FIG. 2B illustrates a flow chart 250 for use of the stored NFTs 125 in a sample configuration. As illustrated in FIG. 2B, the process starts at 260 when the user of the social media application (or electronic eyewear 170 or AR camera 180) selects an NFT 125 from the database 195 for presentation within the user's application. As noted above, the NFTs 125 may be stored with AR lenses for use by applications 132, 134, and 136 as a custom lens during provision of the respective services to the users, as identified by the user's social media ID. The database 195 may include authentication mechanisms to identify the user (e.g., via the user' social media ID) before satisfying the user query for the user's NFTs 125. The accessed NFTs 125 may then be accessed and used like any other Lens in a Lens Studio. At 270, the user's application may optionally modify the selected NFT 125 for display on the user's client device 150 or electronic eyewear 170 based on a number of factors such as the number of followers of that user in the user's social media application 160, the current weather conditions (e.g., show wet NFT 125 using locally stored weather data indicating that it is raining), metadata of the respective NFTs, and the like. For example, the NFT 125 may be modified (to change size, color, and the like) to reflect the user's position in the social media network based on the number of followers of the user or whether the user has interacted with a famous person or other member of the social media network with a large number of followers. The NFT 125 also may be modified at 270 to reflect who is going to view the selected NFT 125. For example, the user's best friend may see a modified version of the NFT 125 that is unique to the user's best friend. At 280, the user's client device 150 may then set the selected NFT 125 as an overlay for the user's face, as a background, or both in the social media application 160 or AR camera 180 in the same way that the user would for an AR Lens.

It will be appreciated that the selected NFT image data may also be used in a dynamic application of the user's client device 150 of electronic eyewear 170 where the receipt of data by the social media application 160 may trigger changes in the NFT 125 based on changes in relationship data and the like.

Figure 3A:
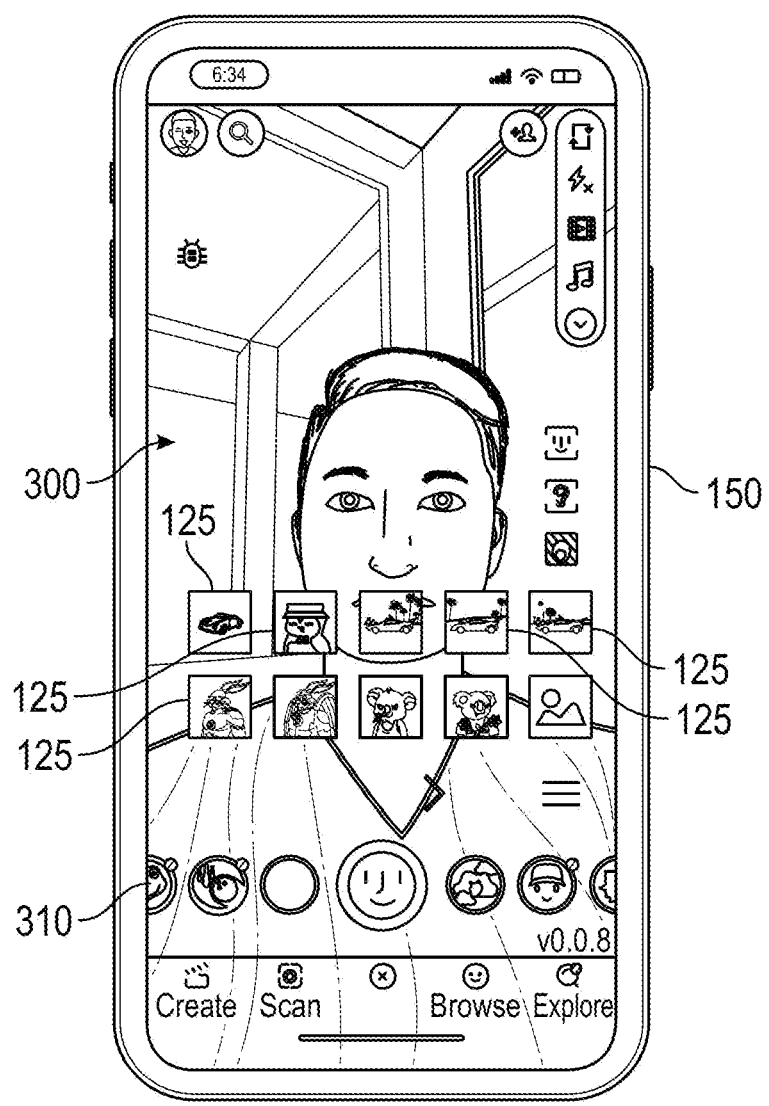
FIGS. 3A-3C illustrate screen shots of a user's mobile phone adapted to select an NFT (FIG. 3A), superimpose the selected NFT over the user's face (FIG. 3B), and apply the selected NFT as background in the user's social media application (FIG. 3C).
Figure 3B:
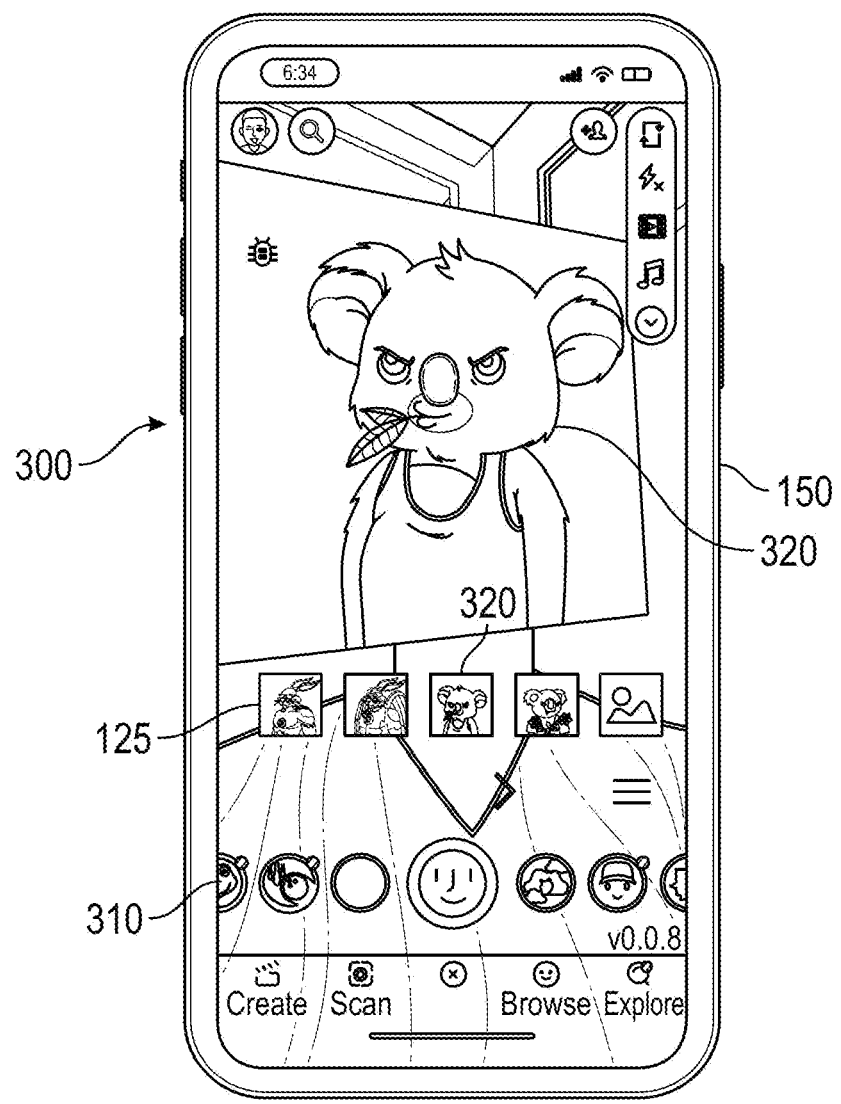
Figure 3C:
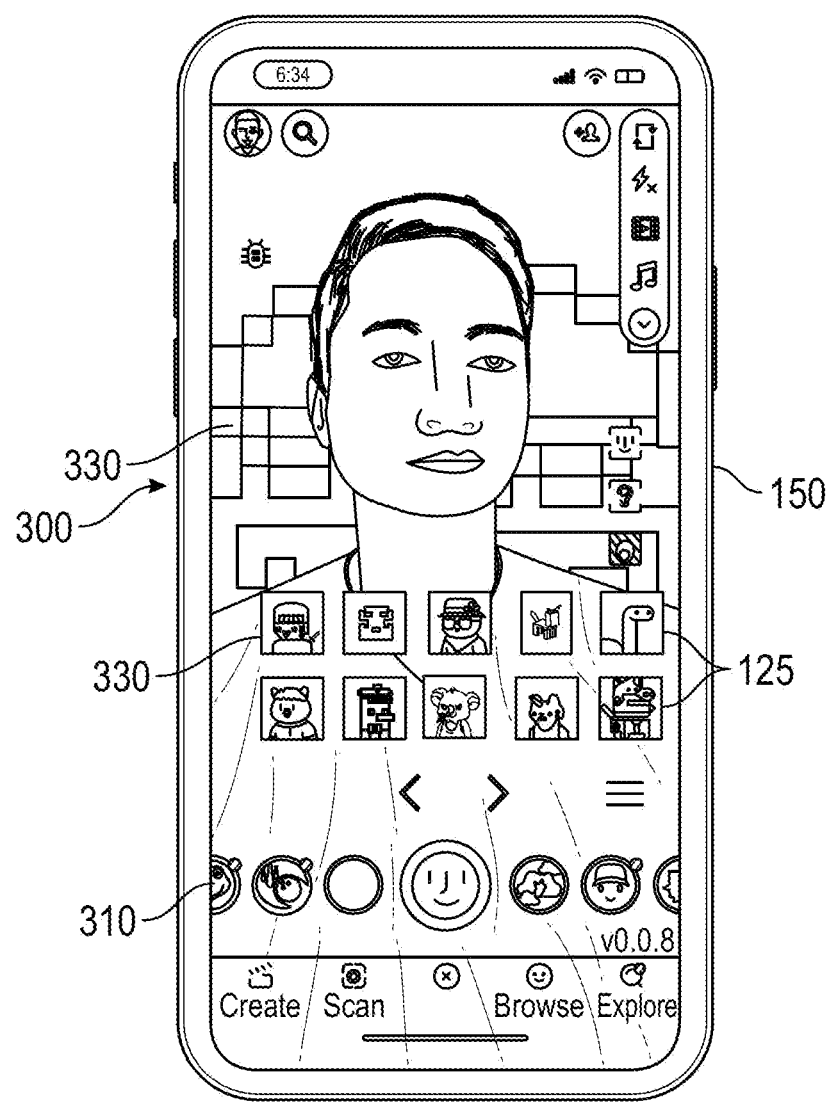

FIGS. 3A-3C illustrate screen shots of a user's mobile phone adapted to select an NFT (FIG. 3A), superimpose the selected NFT over the user's face (FIG. 3B), and apply the selected NFT as background in the user's social media application (FIG. 3C).

FIG. 3A illustrates a screen shot of a selfie image 300 taken by the AR camera 180 of the user's client device 150. As illustrated, the user may select a Lens from a carousel of Lenses 310 or may select an NFT 125 from the available NFTs 125. It will be appreciated that the NFTs 125 may be displayed separately as indicated or may be included in the carousel 310 with the Lenses. Alternatively, the NFTs 125 may be displayed for selection in a separate carousel.

FIG. 3B illustrates a screen shot of the selfie image 300 of FIG. 3A with the selected NFT 320 superimposed over the user's face in the same way that a Lens from carousel 310 may be superimposed over the user's face. As noted above, the selected NFT 320 may optionally have the eyes and mouth portions removed so that the user's eyes and mouth would remain visible through the NFT 320.

FIG. 3C illustrates a screen shot of the selfie image 300 of FIG. 3A with the NFT 330 provided as background for the selfie image 300 in the same way that a Lens from carousel 310 may be used as background for the selfie image 300.

Client Device

Figure 4:
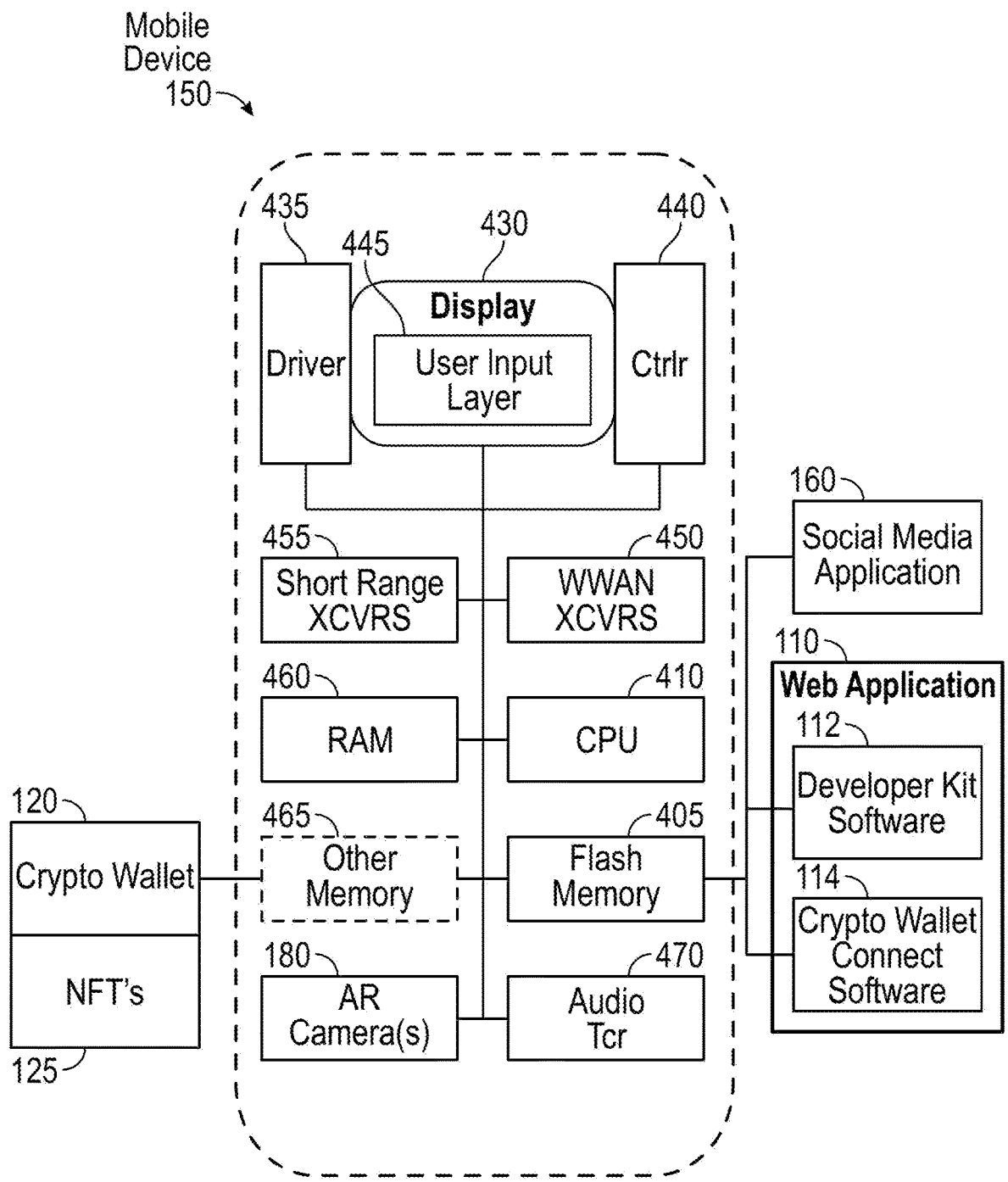
FIG. 4 illustrates a sample configuration of a mobile phone adapted for use with a system for enabling a user to connect the user's crypto wallet to a backend service that associates the user's social media ID with NFTs in the user's crypto wallet in a sample configuration.

FIG. 4 illustrates a sample configuration of a mobile phone 150 adapted for use with a system 100 for enabling a user to connect the user's crypto wallet 120 to a backend server 130 including a service that associates the user's social media ID with NFTs 125 in the user's crypto wallet 120 in a sample configuration. In particular, FIG. 4 is a high-level functional block diagram of an example mobile device that a user may use as the client device 150. Mobile device 150 may include a flash memory 405 that stores programming to be executed by the CPU 410 to perform all or a subset of the functions described herein. For example, the flash memory may store the web application 110 including the Developer Kit software 112 and the crypto wallet connect software 114 as well as social media application software 160. The flash memory 405 may also contain AR camera software for execution by the CPU 410 to provide the AR camera 180 that enables the user of the mobile device 150 to view and manipulate the NFTs 125 as described herein. The AR camera 180 may include one or more visible-light cameras (first and second visible-light cameras with overlapping fields of view) or at least one visible-light camera and a depth sensor with substantially overlapping fields of view. Flash memory 405 may further include multiple images or video, which are generated via the AR camera 180.

The mobile device 150 may further include an image display 430, a mobile display driver 435 to control the image display 430, and a display controller 440. In the example of FIG. 4, the image display 430 may include a user input layer 445 (e.g., a touchscreen) that is layered on top of or otherwise integrated into the screen used by the image display 430. Examples of touchscreen-type mobile devices that may be used include (but are not limited to) a smart phone, a personal digital assistant (PDA), a tablet computer, a laptop computer, or other portable device. However, the structure and operation of the touchscreen-type devices is provided by way of example; the subject technology as described herein is not intended to be limited thereto. For purposes of this discussion, FIG. 4 therefore provides a block diagram illustration of the example mobile device 150 with a user interface that includes a touchscreen input layer 445 for receiving input (by touch, multi-touch, or gesture, and the like, by hand, stylus, or other tool) and an image display 430 for displaying content.

As shown in FIG. 4, the mobile device 150 includes at least one digital transceiver (XCVR) 450, shown as WWAN XCVRs, for digital wireless communications via a wide-area wireless mobile communication network. The mobile device 150 also may include additional digital or analog transceivers, such as short-range transceivers (XCVRs) 455 for short-range network communication, such as via NFC, VLC, DECT, ZigBee, Bluetooth™, or WI-FI®. For example, short range XCVRs 455 may take the form of any available two-way wireless local area network (WLAN) transceiver of a type that is compatible with one or more standard protocols of communication implemented in wireless local area networks, such as one of the WI-FI® standards under IEEE 802.11.

To generate location coordinates for positioning of the mobile device 150, the mobile device 150 also may include a global positioning system (GPS) receiver. Alternatively, or additionally, the mobile device 150 may utilize either or both the short range XCVRs 455 and WWAN XCVRs 450 for generating location coordinates for positioning. For example, cellular network, WI-FI®, or Bluetooth™ based positioning systems may generate very accurate location coordinates, particularly when used in combination. Such location coordinates may be transmitted to the mobile device 150 over one or more network connections via XCVRs 450, 455.

The transceivers 450, 455 (i.e., the network communication interface) may conform to one or more of the various digital wireless communication standards utilized by modern mobile networks. Examples of WWAN transceivers 450 include (but are not limited to) transceivers configured to operate in accordance with Code Division Multiple Access (CDMA) and 3rd Generation Partnership Project (3GPP) network technologies including, for example and without limitation, 3GPP type 2 (or 3GPP2) and LTE, at times referred to as "4G." The transceivers may also incorporate broadband cellular network technologies referred to as "5G." For example, the transceivers 450, 455 provide two-way wireless communication of information including digitized audio signals, still image and video signals, web page information for display as well as web-related inputs, and various types of mobile message communications to/from the mobile device 150.

The mobile device 150 may further include a microprocessor that functions as the central processing unit (CPU) 410. A processor is a circuit having elements structured and arranged to perform one or more processing functions, typically various data processing functions. Although discrete logic components could be used, the examples utilize components forming a programmable CPU. A microprocessor for example includes one or more integrated circuit (IC) chips incorporating the electronic elements to perform the functions of the CPU 410. The CPU 410, for example, may be based on any known or available microprocessor architecture, such as a Reduced Instruction Set Computing (RISC) using an ARM architecture, as commonly used today in mobile devices and other portable electronic devices. Of course, other arrangements of processor circuitry may be used to form the CPU 410 or processor hardware in smartphone, laptop computer, and tablet.

The CPU 410 serves as a programmable host controller for the mobile device 150 by configuring the mobile device 150 to perform various operations, for example, in accordance with instructions or programming executable by CPU 410. For example, such operations may include various general operations of the mobile device 150, as well as operations related to the programming for applications such as social media application 160 or web application 110 on the mobile device 150. Although a processor may be configured by use of hardwired logic, typical processors in mobile devices are general processing circuits configured by execution of programming.

The mobile device 150 further includes a memory or storage system, for storing programming and data. In the example shown in FIG. 4, the memory system may include flash memory 405, a random-access memory (RAM) 460, and other memory components 465, as needed. As illustrated, such memory components 465 may store the user's cryptographic keys that enable the user to interact with their crypto wallet 120 on the blockchain as well as the image or asset representations of the user's NFTs 125. The RAM 460 may serve as short-term storage for instructions and data being handled by the CPU 410, e.g., as a working data processing memory. The flash memory 405 typically provides longer-term storage.

Hence, in the example of mobile device 150, the flash memory 405 may be used to store programming or instructions for execution by the CPU 410. Depending on the type of device, the mobile device 150 stores and runs a mobile operating system through which specific applications are executed. Examples of mobile operating systems include Google Android, Apple iOS (for iPhone or iPad devices), Windows Mobile, Amazon Fire OS, RIM BlackBerry OS, or the like.

Finally, the mobile device 150 may include an audio transceiver 470 that may receive audio signals from the environment via a microphone (not shown) and provide audio output via a speaker (not shown). Audio signals may be coupled with video signals and other messages by a messaging application or social media application implemented on the mobile device 150.

It will be appreciated that the mobile device 150 may accompany or be replaced by an electronic eyewear device 170 that includes all or part of the functionality of mobile device 150 as described herein.

Computer System Configuration

Techniques described herein may be used with one or more of the computer systems described herein or with one or more other systems. For example, the various procedures described herein may be implemented with hardware or software, or a combination of both. For example, at least one of the processor, memory, storage, output device(s), input device(s), or communication connections discussed below can each be at least a portion of one or more hardware components. Dedicated hardware logic components can be constructed to implement at least a portion of one or more of the techniques described herein. For example, and without limitation, such hardware logic components may include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc. Applications that may include the apparatus and systems of various aspects can broadly include a variety of electronic and computer systems. Techniques may be implemented using two or more specific interconnected hardware modules or devices with related control and data signals that can be communicated between and through the modules, or as portions of an application-specific integrated circuit. Additionally, the techniques described herein may be implemented by software programs executable by a computer system. As an example, implementations can include distributed processing, component/object distributed processing, and parallel processing. Moreover, virtual computer system processing can be constructed to implement one or more of the techniques or functionality, as described herein.

Figure 5:
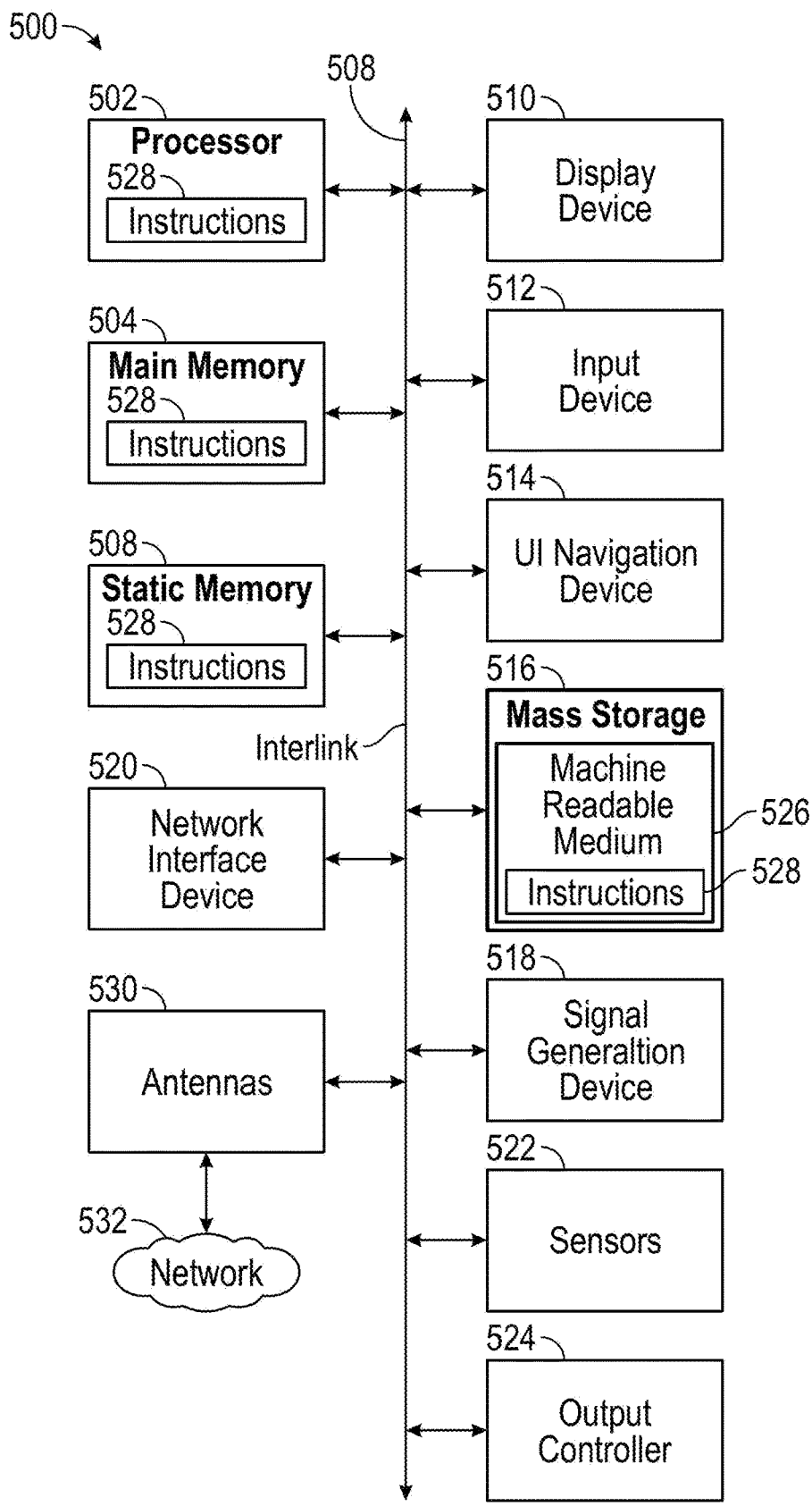
FIG. 5 illustrates a sample configuration of a computer system adapted to implement the processing functionality of the systems and methods described herein.

FIG. 5 illustrates a sample configuration of a computer system adapted to implement the processing functionality of the systems and methods described herein. In particular, FIG. 5 illustrates a block diagram of an example of a machine 500 upon which one or more configurations may be implemented. In alternative configurations, the machine 500 may operate as a standalone device or may be connected (e.g., networked) to other machines. In a networked deployment, the machine 500 may operate in the capacity of a server machine, a client machine, or both in server-client network environments. In an example, the machine 500 may act as a peer machine in peer-to-peer (P2P) (or other distributed) network environment. In sample configurations, the machine 500 may be a personal computer (PC), a tablet PC, a set-top box (STB), a personal digital assistant (PDA), a mobile telephone, a smart phone, a web appliance, a server, a network router, switch or bridge, or any machine capable of executing instructions (sequential or otherwise) that specify actions to be taken by that machine. For example, machine 500 may serve as a workstation, a front-end server, or a back-end server of a communication system. Machine 500 may implement the methods described herein by running the social media software 132, 134, 136 and the API endpoints 190 used to implement the techniques described herein. Further, while only a single machine 500 is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate on, processors, logic, or a number of components, modules, or mechanisms (herein "modules"). Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. The software, when executed by the underlying hardware of the module, causes the hardware to perform the specified operations.

Accordingly, the term "module" is understood to encompass at least one of a tangible hardware or software entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Machine (e.g., computer system) 500 may include a hardware processor 502 (e.g., a central processing unit (CPU), a graphics processing unit (GPU), a hardware processor core, or any combination thereof), a main memory 504 and a static memory 506, some or all of which may communicate with each other via an interlink (e.g., bus) 508. The machine 500 may further include a display unit 510 (shown as a video display), an alphanumeric input device 512 (e.g., a keyboard), and a user interface (UI) navigation device 514 (e.g., a mouse). In an example, the display unit 510, input device 512 and UI navigation device 514 may be a touch screen display. The machine 500 may additionally include a mass storage device (e.g., drive unit) 516, a signal generation device 518 (e.g., a speaker), a network interface device 520, and one or more sensors 522. Example sensors 522 include one or more of a global positioning system (GPS) sensor, compass, accelerometer, temperature, light, camera, video camera, sensors of physical states or positions, pressure sensors, fingerprint sensors, retina scanners, or other sensors. The machine 500 may include an output controller 524, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The mass storage device 516 may include a machine readable medium 526 on which is stored one or more sets of data structures or instructions 528 (e.g., software) embodying or utilized by any one or more of the techniques or functions described herein. The instructions 528 may also reside, completely or at least partially, within the main memory 504, within static memory 506, or within the hardware processor 502 during execution thereof by the machine 500. In an example, one or any combination of the hardware processor 502, the main memory 504, the static memory 506, or the mass storage device 516 may constitute machine readable media.

While the machine readable medium 526 is illustrated as a single medium, the term "machine readable medium" may include a single medium or multiple media (e.g., at least one of a centralized or distributed database, or associated caches and servers) configured to store the one or more instructions 528. The term "machine readable medium" may include any medium that is capable of storing, encoding, or carrying instructions for execution by the machine 500 and that cause the machine 500 to perform any one or more of the techniques of the present disclosure, or that is capable of storing, encoding, or carrying data structures used by or associated with such instructions. Non-limiting machine readable medium examples may include solid-state memories, and optical and magnetic media. Specific examples of machine readable media may include non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); Solid State Drives (SSD); and CD-ROM and DVD-ROM disks. In some examples, machine readable media may include non-transitory machine-readable media. In some examples, machine readable media may include machine readable media that is not a transitory propagating signal.

The instructions 528 may further be transmitted or received over communications network 532 using a transmission medium via the network interface device 520. The machine 500 may communicate with one or more other machines utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®), IEEE 802.15.4 family of standards, a Long Term Evolution (LTE) family of standards, a Universal Mobile Telecommunications System (UMTS) family of standards, peer-to-peer (P2P) networks, among others. In an example, the network interface device 520 may include one or more physical jacks (e.g., Ethernet, coaxial, or phone jacks) or one or more antennas 530 to connect to the communications network 532. In an example, the network interface device 520 may include a plurality of antennas 530 to wirelessly communicate using at least one of single-input multiple-output (SIMO), multiple-input multiple-output (MIMO), or multiple-input single-output (MISO) techniques. In some examples, the network interface device 520 may wirelessly communicate using Multiple User MIMO techniques.

The features and flow charts described herein can be embodied in on one or more methods as method steps or in one more applications as described previously. According to some configurations, an "application" or "applications" are program(s) that execute functions defined in the programs. Various programming languages can be employed to generate one or more of the applications, structured in a variety of manners, such as object-oriented programming languages (e.g., Objective-C, Java, or C++) or procedural programming languages (e.g., C or assembly language). In a specific example, a third party application (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating systems. In this example, the third party application can invoke API calls provided by the operating system to facilitate functionality described herein. The applications can be stored in any type of computer readable medium or computer storage device and be executed by one or more general purpose computers. In addition, the methods and processes disclosed herein can alternatively be embodied in specialized computer hardware or an application specific integrated circuit (ASIC), field programmable gate array (FPGA) or a complex programmable logic device (CPLD).

Program aspects of the technology may be thought of as "products" or "articles of manufacture" typically in the form of at least one of executable code or associated data that is carried on or embodied in a type of machine readable medium. For example, programming code could include code for the touch sensor or other functions described herein. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from the server system 130 or host computer of the service provider into the computer platforms of the client devices 120. Thus, another type of media that may bear the programming, media content or meta-data files includes optical, electrical, and electromagnetic waves, such as used across physical interfaces between local devices, through wired and optical landline networks and over various air-links. The physical elements that carry such waves, such as wired or wireless links, optical links, or the like, also may be considered as media bearing the software. As used herein, unless restricted to "non-transitory," "tangible," or "storage" media, terms such as computer or machine "readable medium" refer to any medium that participates in providing instructions or data to a processor for execution.

Hence, a machine readable medium may take many forms of tangible storage medium. Non-volatile storage media include, for example, optical or magnetic disks, such as any of the storage devices in any computer(s) or the like, such as may be used to implement the client device, media gateway, transcoder, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer may read at least one of programming code or data. Many of these forms of computer readable media may be involved in carrying one or more sequences of one or more instructions to a processor for execution. However, the claims that follow are not to be construed to cover a signal per se.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," "includes," "including," or any other variation thereof, are intended to cover a non-exclusive inclusion, such that a process, method, article, or apparatus that comprises or includes a list of elements or steps does not include only those elements or steps but may include other elements or steps not expressly listed or inherent to such process, method, article, or apparatus. An element preceded by "a" or "an" does not, without further constraints, preclude the existence of additional identical elements in the process, method, article, or apparatus that comprises the element.

Unless otherwise stated, any and all measurements, values, ratings, positions, magnitudes, sizes, and other specifications that are set forth in this specification, including in the claims that follow, are approximate, not exact. Such amounts are intended to have a reasonable range that is consistent with the functions to which they relate and with what is customary in the art to which they pertain. For example, unless expressly stated otherwise, a parameter value or the like may vary by as much as ±10% from the stated amount.

In addition, in the foregoing Detailed Description, it can be seen that various features are grouped together in various examples for the purpose of streamlining the disclosure. This method of disclosure is not to be interpreted as reflecting an intention that the claimed examples require more features than are expressly recited in each claim. Rather, as the following claims reflect, the subject matter to be protected lies in less than all features of any single disclosed example. Thus, the following claims are hereby incorporated into the Detailed Description, with each claim standing on its own as a separately claimed subject matter.

While the foregoing has described what are considered to be the best mode and other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present concepts.

What is claimed is:

1. A method of displaying on a user device at least one non-fungible token (NFT) in a social media or augmented reality application that displays video data, comprising:

connecting using a web application, a user's crypto wallet to a server that provides services to the social media or augmented reality application;

associating, by the web application, the user's social media ID with at least one NFT in the user's crypto wallet;

sending, by the web application, image data of the at least one NFT to a database of the server, at least one of resizing or changing a file type of the image data of the at least one NFT of the to make the image data of the at least one NFT accessible by the social media or augmented reality application for display on the user device;

providing, by the web application, the at least one resized or changed image data of the at least one NFT to a display of the user device for selection;

receiving a selection of the at least one NFT during use of the social media or augmented reality application; and at least one of (1) superimposing image data of the selected at least one NFT over the video data displayed by the social media or augmented reality application on the user device, where the video data includes an image of the user's face, or (2) providing image data of the selected at least one NFT as a background image for the video data displayed by the social media or augmented reality application on the user device.

2. The method of claim 1, wherein receiving the selection of the at least one NFT comprises receiving image data of the at least one NFT from the web application, the web application connecting the database to the user's crypto wallet.

3. The method of claim 1, further comprising processing the image data of the at least one NFT to crop out eyes and the mouth of the image data of the at least one NFT for registration with the user's eyes and mouth when the image data of the at least one NFT is superimposed over the user's face by the social media or augmented reality application.

4. The method of claim 2, wherein receiving the selection of the at least one NFT comprises presenting to the user device a list of NFTs available to the user, the list including the at least one NFT, and receiving the user selection of the at least one NFT from the list of NFTs available to the user.

5. The method of claim 4, wherein presenting to the user device the list of NFTs available to the user comprises at least one of presenting image data of available NFTs to the user device in a carousel of NFTs or presenting image data of the available NFTs to the user device in a carousel of lenses and NFTs.

6. The method of claim 4, wherein the list of NFTs available to the user includes NFTs of the user, including the at least one NFT, that have been stored in the database as well as NFTs of other users to which the user has received permission to access.

7. The method of claim 1, wherein providing the at least one NFT to the display of the user device for selection comprises providing the image data of the at least one NFT to the user device upon satisfaction of at least one constraint, the at least one constraint including whether the user has a pre-registered face or location.

8. The method of claim 1, further comprising modifying the image data of the at least one NFT for display on the user device based on at least one of a number of followers of the user in the application, current weather conditions, or metadata of the at least one NFT.

9. The method of claim 8, wherein modifying the image data of the at least one NFT comprises changing at least one of a color or size of the image data of the at least one NFT to reflect at least one of the user's position in a network of users of the social media or augmented reality application, whether the user has interacted with a famous person or other member of the network with a large number of followers, or who is going to view the selected at least one NFT.

10. The method of claim 8, wherein modifying the image data of the at least one NFT comprises modifying the image data of the at least one NFT in response to receipt of data by the social media or augmented reality application that triggers changes in the image data of the at least one NFT based on a change in relationship data of the user.

11. A user device that displays at least one non-fungible token (NFT) in an
   a social media or augmented reality application that displays video data, comprising:
   a display;
   at least one memory that stores instructions and the social media or augmented reality application that displays video data; and
   a processor that executes the instructions stored in the memory to enable display of the at least one NFT by:
   connecting a crypto wallet of the user to a server that provides services to the social media or augmented realty application, the crypto wallet containing image data of the at least one NFT;
   associating the user's social media ID with the at least one NFT in the user's crypto wallet;
   sending image data of the at least one NFT to a database of the server,
   resizing or changing in file type the image data of the at least one NFT to make the re data of the at least one NFT accessible by the social media or augmented reality application for display on the user device;
   providing the at least one resized or changed image data of the at least one NFT to the display for selection;
   receiving a selection of the at least one NFT during use of the social media or augmented reality application; and
   at least one of (1) superimposing the image data of the selected at least one NFT over the video data displayed by the social media or augmented reality application on the display, where the video data includes an image of the user's face, or (2) displaying the image data of the selected at least one NFT as a background image for the video data displayed by the social media or augmented reality application on the display.

12. The device of claim 11, wherein the instructions comprise a web application executing on the processor, the web application connecting the user's crypto wallet to the database.

13. The device of claim 12, wherein the instructions further comprise instructions that, when executed by the processor, cause the processor to implement further operations including presenting to the display a list of NFTs available to the user, the list including the at least one NFT, and receiving the user selection of the at least one NFT from the list of NFTs available to the user.

14. The device of claim 13, wherein the instructions further comprise instructions that, when executed by the processor, cause the processor to implement further operations including presenting image data of available NFTs to the display in a carousel of NFTs or presenting image data of the available NFTs to the display in a carousel of lenses and NFTs.

15. The device of claim 13, wherein the list of NFTs available to the user includes NFTs of the user, including the at least one NFT, that have been stored in the database as well as NFTs of other users to which the user has received permission to access.

16. The device of claim 11, the instructions further comprise instructions that, when executed by the processor, cause the processor to implement further operations including providing the image data of the at least one NFT to the user device upon satisfaction of at least one constraint, the at least one constraint including whether the user has a pre-registered face or location.

17. The device of claim 11, the instructions further comprise instructions that, when executed by the processor, cause the processor to implement further operations including modifying image data of the selected at least one NFT for display on the display based on at least one of a number of followers of the user in the application, current weather conditions, metadata of the at least one NFT, or based on a change in relationship data of the user.

18. The device of claim 17, the instructions further comprise instructions that, when executed by the processor, cause the processor to implement further operations including changing at least one of a color or size of the image data of the selected at least one NFT to reflect at least one of the user's position in a network of users of the social media or augmented reality application, whether the user has interacted with a famous person or other member of the network with a large number of followers, or who is going to view the selected at least one NFT.

19. A non-transitory computer readable medium having stored thereon instructions, wherein execution of the instructions of the non-transitory computer readable medium cause display on a user device at least one non-fungible token (NFT) in a social media or augmented reality application that displays video data, by performing steps including:
   connecting a user's crypto wallet to a serv that provides services to the social media or augmented reality application;
   associating the user's social media ID with at least one NFT in the user's crypto wallet;
   sending image data of the at least one NFT to a database of the server:
   at least one of resizing or changing a file type of the image data of the at least one NFT of th to make the image data of the at least one NFT accessible by the social media or augmented reality application for display on the user device;
   providing the at least one resized or changed image data of the at least one NFT to a display of the user device for selection,
   receiving a selection of the at least one NFT during use of the social media or augmented reality application; and
   at least one of (1) superimposing image data of the selected at least one NFT over the video data displayed by the social media or augmented reality application on the user device, where the video data includes an image of the user's face, or (2) providing image data of the selected at least one NFT as a background image for the video data displayed by the social media or augmented reality application on the user device.

* * * * *